(12) United States Patent
Fomin et al.

(10) Patent No.: US 10,379,780 B2
(45) Date of Patent: Aug. 13, 2019

(54) STATISTICS MANAGEMENT FOR SCALE-OUT STORAGE

(71) Applicant: EMC Corporation, Hopkinton, MA (US)

(72) Inventors: Andrey Fomin, Vesevolozhsk (RU); Mikhail Danilov, Saint Petersburg (RU); Vladimir Prikhodko, Saint Petersburg (RU); Maxim Trusov, Saint Petersburg (RU); Mikhail Malygin, Saint Petersburg (RU)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 136 days.

(21) Appl. No.: 15/193,145

(22) Filed: Jun. 27, 2016

(65) Prior Publication Data

US 2017/0177273 A1    Jun. 22, 2017

(30) Foreign Application Priority Data

Dec. 21, 2015   (RU) ................................ 2015154746

(51) Int. Cl.
*G06F 3/06* (2006.01)

(52) U.S. Cl.
CPC .......... *G06F 3/0653* (2013.01); *G06F 3/0604* (2013.01); *G06F 3/064* (2013.01); *G06F 3/067* (2013.01); *G06F 3/0635* (2013.01)

(58) Field of Classification Search
None
See application file for complete search history.

(56) References Cited

U.S. PATENT DOCUMENTS

| 6,070,003 | A | 5/2000 | Gove et al. |
|---|---|---|---|
| 6,550,035 | B1 | 4/2003 | Okita |
| 7,549,110 | B2 | 6/2009 | Stek et al. |
| 7,559,007 | B1 | 7/2009 | Wilkie |
| 7,581,156 | B2 | 8/2009 | Manasse |
| 8,458,515 | B1 | 6/2013 | Saeed |
| 8,532,212 | B2 | 9/2013 | Ito |
| 8,683,296 | B2 | 3/2014 | Anderson et al. |
| 8,683,300 | B2 | 3/2014 | Stek et al. |
| 8,762,642 | B2 | 6/2014 | Bates et al. |
| 8,914,706 | B2 | 12/2014 | Anderson |
| 2005/0038968 | A1 | 2/2005 | Iwamura et al. |
| 2006/0105724 | A1 | 5/2006 | Nakao |
| 2006/0147219 | A1 | 7/2006 | Yoshino et al. |
| 2008/0126357 | A1 | 5/2008 | Casanova et al. |
| 2009/0112953 | A1* | 4/2009 | Barsness ............. G06F 12/0269 |
| 2010/0091842 | A1 | 4/2010 | Ikeda et al. |

(Continued)

OTHER PUBLICATIONS

U.S. Appl. No. 15/281,172, filed Sep. 30, 2016, Truosv et al.

(Continued)

*Primary Examiner* — Ann J Lo
*Assistant Examiner* — Brett P Lohmeier
(74) *Attorney, Agent, or Firm* — Daly, Crowley Mofford & Durkee, LLP (57) ABSTRACT

Systems and processes for statistics management in a distributed storage system using a flat cluster architecture. Statistics for managed objects are collected using virtual statistics groups across multiple storage nodes. The systems and processes are compatible with storage systems that utilize microservice architectures.

14 Claims, 7 Drawing Sheets

(56) References Cited

U.S. PATENT DOCUMENTS

| | | | |
|---|---|---|---|
| 2010/0180176 | A1 | 7/2010 | Yosoku et al. |
| 2010/0246663 | A1 | 9/2010 | Citta et al. |
| 2011/0053639 | A1 | 3/2011 | Etienne Suanez et al. |
| 2011/0055494 | A1 | 3/2011 | Roberts et al. |
| 2011/0196900 | A1* | 8/2011 | Drobychev ....... G06F 17/30575 707/812 |
| 2012/0051208 | A1 | 3/2012 | Li et al. |
| 2012/0106595 | A1 | 5/2012 | Bhattad et al. |
| 2013/0067187 | A1 | 3/2013 | Moss et al. |
| 2014/0046997 | A1* | 2/2014 | Dain ................... H04L 67/2861 709/201 |
| 2016/0239384 | A1 | 8/2016 | Slik et al. |
| 2017/0046127 | A1* | 2/2017 | Fletcher ................... G06F 7/10 |

OTHER PUBLICATIONS

U.S. Appl. No. 15/398,832, filed Jan. 5, 2017, Danilov et al.
U.S. Appl. No. 15/398,826, filed Jan. 5, 2017, Danilov et al.
U.S. Appl. No. 15/398,819, filed Jan. 5, 2017, Danilov et al.
Anvin, "The Mathematics of RAID-6;" First Version Jan. 20, 2004; Last Updated Dec. 20, 2011; Retrieved from https://www.kernel.org/pub/linux/kernel/people/hpa/raid6.pdf; 9 Pages.
Blömer et al., "An XOR-Based Erasure-Resilient Coding Scheme;" Article from CiteSeer; Oct. 1999; 19 Pages.
U.S. Appl. No. 15/620,892, filed Jun. 13, 2017, Danilov et al.
U.S. Appl. No. 15/620,897, filed Jun. 13, 2017, Danilov et al.
U.S. Appl. No. 15/620,898, filed Jun. 13, 2017, Danilov et al.
U.S. Appl. No. 15/620,900, filed Jun. 13, 2017, Danilov et al.
U.S. Appl. No. 14/929,788, filed Nov. 2, 2015, Kurilov et al.
U.S. Appl. No. 15/083,324, filed Mar. 29, 2016, Danilov et al.
U.S. Appl. No. 15/193,144, filed Jun. 27, 2016, Kurilov et al.
U.S. Appl. No. 15/193,141, filed Jun. 27, 2016, Danilov et al.
U.S. Appl. No. 15/186,576, filed Jun. 20, 2016, Malygin et al.
U.S. Appl. No. 15/193,407, filed Jun. 27, 2016, Danilov et al.
U.S. Appl. No. 15/193,142, filed Jun. 27, 2016, Danilov et al.
U.S. Appl. No. 15/193,409, filed Jun. 27, 2016, Trusov et al.
Office Action dated Nov. 27, 2017 from U.S. Appl. No. 15/186,576; 11 Pages.
Office Action dated Dec. 14, 2017 from U.S. Appl. No. 15/281,172; 9 Pages.
Response to Office Action dated Sep. 15, 2017 from U.S. Appl. No. 15/193,409, filed Dec. 14, 2017; 11 Pages.
Response to Office Action dated Oct. 5, 2017 from U.S. Appl. No. 15/193,407, filed Dec. 20, 2017; 12 Pages.
U.S. Non-Final Office Action dated Oct. 5, 2017 for U.S. Appl. No. 15/193,407; 14 Pages.
U.S. Non-Final Office Action dated Sep. 15, 2017 for U.S. Appl. No. 15/193,409; 12 Pages.
Response to U.S. Non-Final Office Action dated Nov. 27, 2017 for U.S. Appl. No. 15/186,576; Response filed on Feb. 23, 2018; 7 pages.
Notice of Allowance dated May 15, 2018 for U.S. Appl. No. 15/186,576; 5 pages.

* cited by examiner

STATISTICS MANAGEMENT FOR SCALE-OUT STORAGE

CROSS REFERENCE TO RELATED APPLICATIONS

This application claims priority to Russian Application Number 2015154746, filed on Dec. 21, 2015, and entitled "STATISTICS MANAGEMENT FOR SCALE-OUT STORAGE," which is incorporated herein by reference in its entirety.

BACKGROUND

Distributed storage systems (or "clusters") may utilize a dedicated node (sometimes referred to as a "principal node") to coordinate activity. Among other cluster-level functions, the principal node may be responsible for tracking statistics across the cluster, such as the number of read and write requests to specific resources managed by the cluster.

SUMMARY

A drawback of the above approach is that the principal node can become a bottleneck as the cluster scales up, which can in turn impact cluster stability. To overcome this limitation, a flat architecture may be used whereby cluster-level functions are distributed evenly among the nodes. This approach allows building massive scale-out clusters having thousands of nodes. An example of a distributed storage system employing a flat cluster architecture is as Elastic Cloud Storage (ECS) from EMC Corporation of Hopkinton, Mass., provide a wide range of storage services.

According to one aspect of the disclosure, a method is provided for use with a distributed storage system comprising a plurality of storage devices. The method may include: initializing a statistics group on a plurality of storage nodes, the statistics group associated with a managed object; assigning ownership of the managed object to a first one of the storage nodes; collecting statistics values for the managed object on the first one of the storage nodes; changing ownership of the managed object to a second one of the storage nodes; collecting statistics values for the managed object on the second one of the storage nodes; receiving a request for a statistics value within the statistics group; combining the statistics values collected on the first one of the storage nodes and the statistics values collected on the second one of the storage nodes; and returning the combined statistics values.

In some embodiments, combining the statistics values collected on the first one of the storage nodes and the statistics values collected on the second one of the storage nodes comprises computing a statistics function over the statistics values collected on the first one of the storage nodes and the statistics values collected on the second one of the storage nodes. The statistics function may be one of sum, latest, min, or max. In various embodiments, the statistics values collected on the first one of the storage nodes and the statistics values collected on the second one of the storage nodes comprises appending time series data collected on the second one of the storage nodes to time series data collected on the first one of the storage nodes. In certain embodiments of the method and/or system, the managed object is a table configured to store metadata about storage chunks stored within the storage devices.

According to another aspect of the disclosure, a distributed storage system comprises a plurality of storage nodes each having a plurality of storage devices. The storage nodes may be configured to: initialize a statistics group on a plurality of storage nodes, the statistics group associated with a managed object; assign ownership of the managed object to a first one of the storage nodes; collecting statistics values for the managed object on the first one of the storage nodes; change ownership of the managed object to a second one of the storage nodes; collect statistics values for the managed object on the second one of the storage nodes; receive a request for a statistics value within the statistics group; combine the statistics values collected on the first one of the storage nodes and the statistics values collected on the second one of the storage nodes; and return the combined statistics values. In some embodiments, the managed object is a table configured to store metadata about storage chunks stored within the storage devices.

In certain embodiments, the storage nodes are configured to computing a statistics function over the statistics values collected on the first one of the storage nodes and the statistics values collected on the second one of the storage nodes. In some embodiments, the storage nodes are configured to append time series data collected on the second one of the storage nodes to time series data collected on the first one of the storage nodes. The statistics function may be one of sum, latest, min, or max.

In some embodiments, the distributed storage system employs a microservice architecture. In particular, the storage nodes may include a statistics manager microservice and a plurality of statistics clients each configured to maintain statistics for one or more managed objects and to send statistics to the statistics manager. In certain embodiments, the statistics manager includes a REST (Representational State Transfer) API configured to process statistics requests from user applications. The statistics manager may include a database to store statistics received from the plurality of statistics clients.

BRIEF DESCRIPTION OF THE DRAWINGS

The concepts, structures, and techniques sought to be protected herein may be more fully understood from the following detailed description of the drawings, in which.

The drawings are not necessarily to scale, or inclusive of all elements of a system, emphasis instead generally being placed upon illustrating the concepts, structures, and techniques sought to be protected herein.

DETAILED DESCRIPTION

Before describing embodiments of the structures and techniques sought to be protected herein, some terms are explained. As used herein, the phrases "computer," "computing system," "computing environment," "processing platform," "data memory and storage system," and "data memory and storage system environment" are intended to be broadly construed so as to encompass, for example, private or public cloud computing or storage systems, or parts thereof, as well as other types of systems comprising distributed virtual infrastructure and those not comprising virtual infrastructure. The terms "application," "program," "application program," and "computer application program" herein refer to any type of software application, including desktop applications, server applications, database applications, and mobile applications.

As used herein, the term "storage device" refers to any non-volatile memory (NVM) device, including hard disk drives (HDDs), flash devices (e.g., NAND flash devices), and next generation NVM devices, any of which can be accessed locally and/or remotely (e.g., via a storage attached network (SAN)). The term "storage device" can also refer to a storage array comprising one or more storage devices.

Figure 1:
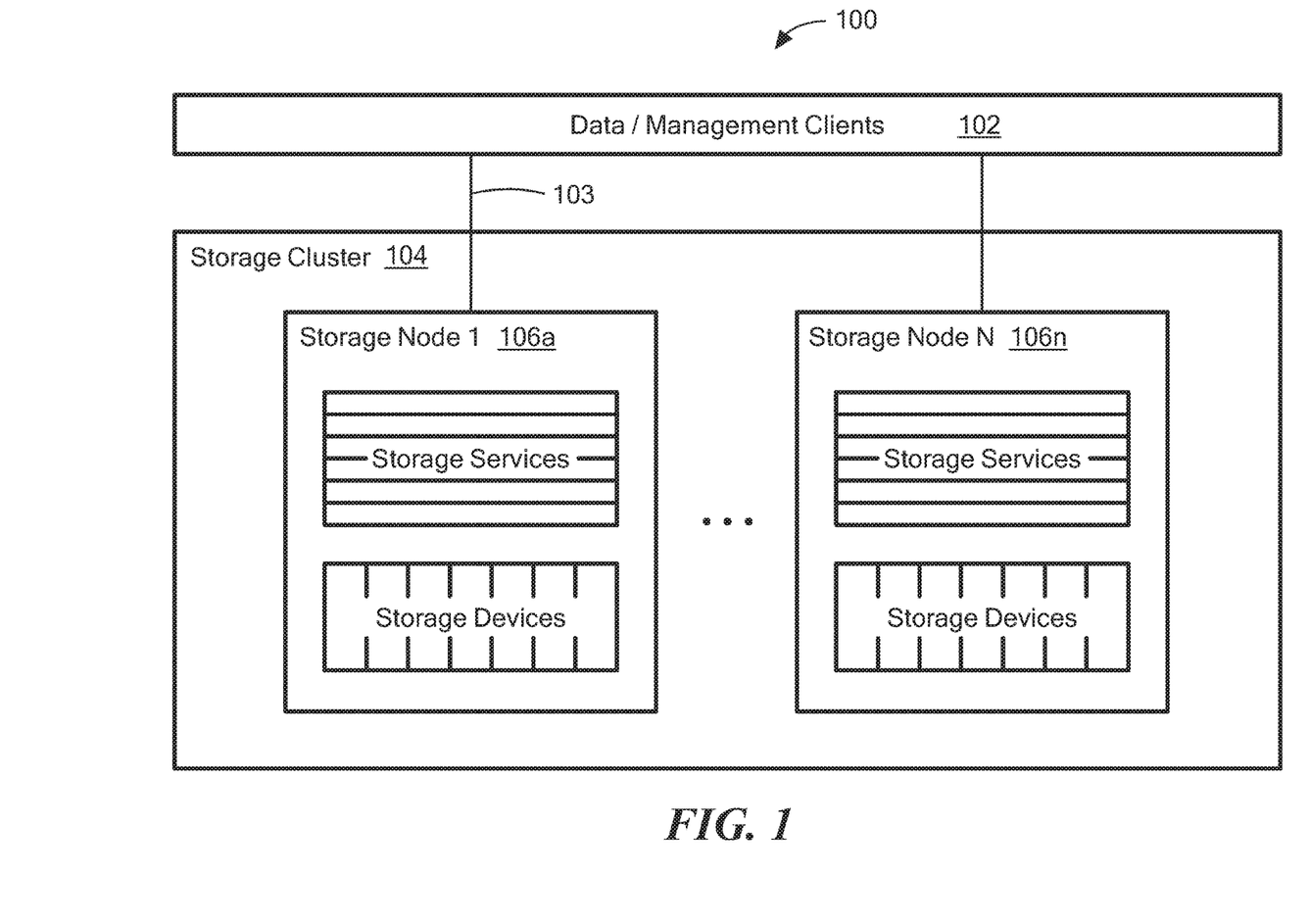
FIG. 1 is a block diagram of an illustrative distributed storage system, in accordance with an embodiment of the disclosure.
Figure 1A:
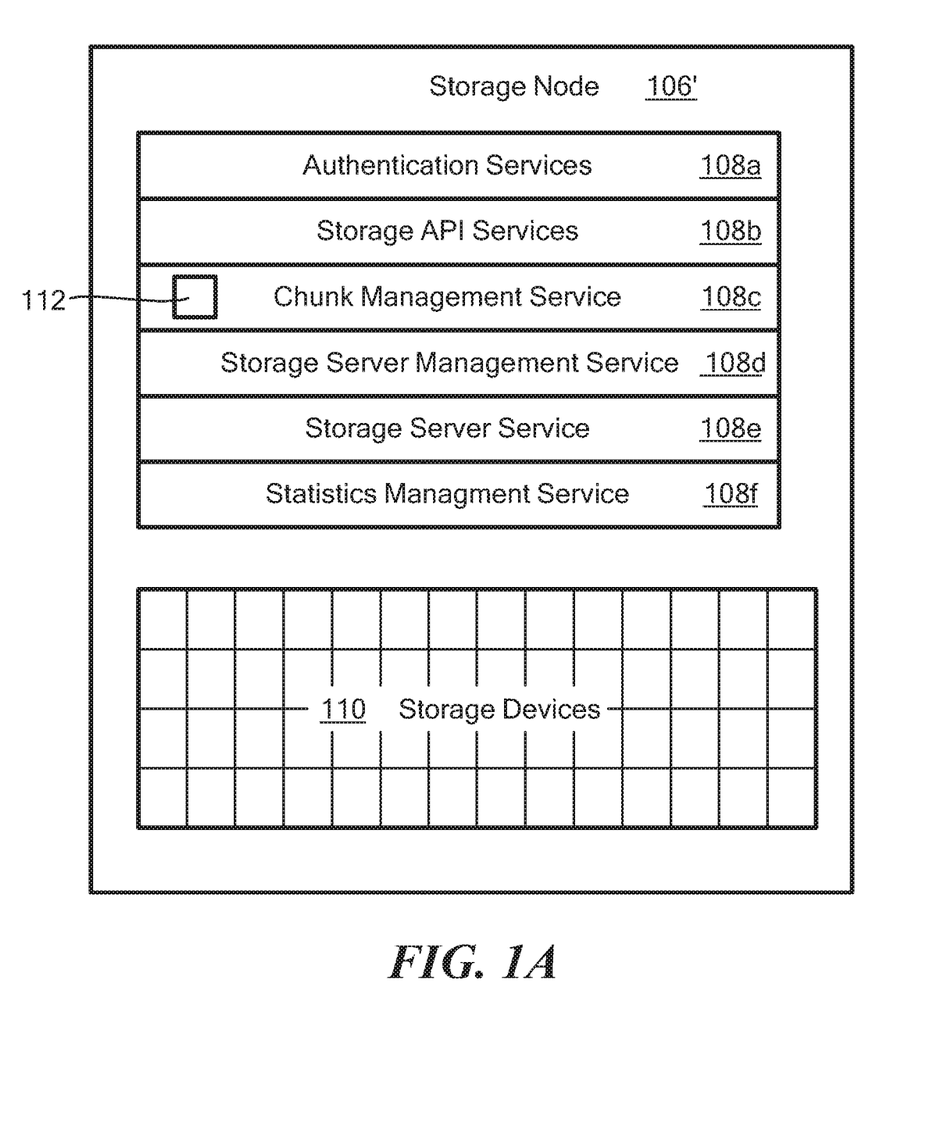
FIG. 1A is a block diagram of an illustrative storage node which may form a part of the distributed storage system of FIG. 1, in accordance with an embodiment of the disclosure.

FIG. 1 shows a distributed storage system, in accordance with an embodiment of the disclosure. An illustrative distributed storage system 100 includes one or more clients 102 in communication with a storage cluster 104 via a network 103. The network 103 may include any suitable type of communication network or combination thereof, including networks using protocols such as Ethernet, Internet Small Computer System Interface (iSCSI), Fibre Channel (FC), and/or wireless protocols. The clients 102 may include user applications, application servers, data management tools, and/or testing systems. The storage cluster 104 includes one or more storage nodes 106a . . . 106n (generally denoted 106). An illustrative storage node is shown in FIG. 1A and described below in conjunction therewith.

In general operation, clients 102 issue requests to the storage cluster 104 to read and write data. Write requests may include requests to store new data and requests to update previously stored data. Data read and write requests include an ID value to uniquely identify the data within the storage cluster 104. A client request may be received by any available storage node 106. The receiving node 106 may process the request locally and/or may delegate request processing to one or more peer nodes 106. For example, if a client issues a data read request, the receiving node may delegate/proxy the request to peer node where the data resides.

During operation, the system 100 can maintain cluster-level storage statistics. For example, the system may track the total number of storage devices connected to all nodes 106 as well as the total storage capacity of those devices. The distributed storage system 100 may use a flat architecture whereby cluster-level functions are distributed evenly among the storage nodes 106. To efficiently and reliably manage statistics using a flat cluster architecture, statistics may be collected by individual nodes and subsequently combined, according to techniques described below.

In various embodiments, the distributed storage system 100 comprises an object storage system, wherein data is read and written in the form of objects, which are uniquely identified by object IDs. In some embodiments, the storage cluster 104 utilizes Elastic Cloud Storage (ECS) from EMC Corporation of Hopkinton, Mass.

FIG. 1A shows a storage node, in accordance with an embodiment of the disclosure. The illustrative storage node 106'—which may be the same as or similar to a storage node 106 in FIG. 1—includes one or more services 108 and one or more storage devices 110. A storage node 106' may include a processor (not shown) configured to execute instructions associated with the services 108.

The storage devices 110, which may be provided as hard drives or other types of storage devices, are attached to the storage node 106a. In some embodiments, between fifteen (15) and sixty (60) storage devices 110 are attached to a node 106.

In the example shown, the services provided on a storage node 106' include: an authentication service 108a to authenticate requests from clients 102; storage API services 108b to parse and interpret requests from clients 102; a storage chunk management service 108c to facilitate storage chunk allocation/reclamation for different storage system needs and monitor storage chunk health and usage; a storage server management service 108d to manage available storage devices and to track storage devices states; a storage server service 108e to interface with the storage devices 110; and a statistics management service (or "statistics manager") 108f, which is described in detail below.

While services 108 are executed locally on individual nodes 106, they can provide cluster-level functionality. For example, multiple instances of the statistics manager 108f running on different nodes 106 can work together to provide cluster-level storage statistics. Such services are referred to herein as "cluster-level services."

To implement cluster-level services using a flat cluster architecture, processing may be coordinated and shared among several nodes using the concept of managed objects. A managed object is a physical or logical entity within the cluster. A managed object may be associated with a particular service 108 and, at any given time, each managed object is owned by a single node 106'. For example, the chunk management service 108c may manage various tables 112 to track the location and status of storage chunks within the cluster. Each chunk table 112 is considered to be a managed object owned by a single node 106 at any given time. Thus, the work involved with managing several tables can be shared across multiple nodes. The owner node is responsible for all updates to the table. As another example, managed objects may correspond to physical storage devices.

In some embodiments, ownership of a managed objects can change frequently. For example, any change to the cluster state (e.g., addition or removal of a node) can cause managed object ownership to change. When ownership changes, any contextual data associated with a managed object is transferred from the old owner node to the new owner node. Depending on cluster state and size, a given node 106' may own from none, some, or all managed objects associated with a particular service 108.

A distributed storage system 100 can maintain statistics useful for serviceability and monitoring needs. This may include statistics about storage devices 110, such as total capacity and used capacity, in addition to statistics about managed objects, such as the number of reads and writes to a table. Within a given node 106', the statistics manager 108f is responsible for maintaining statistics for the node itself (e.g., statistics about incoming user traffic) in addition to statistics for any managed objects currently owned by that node. For each given managed object, the statistics manager 108*f* can maintain multiple statistics (e.g., number of reads, number of writes, etc.), which may be grouped together to form a "statistics group."

Figure 1B:
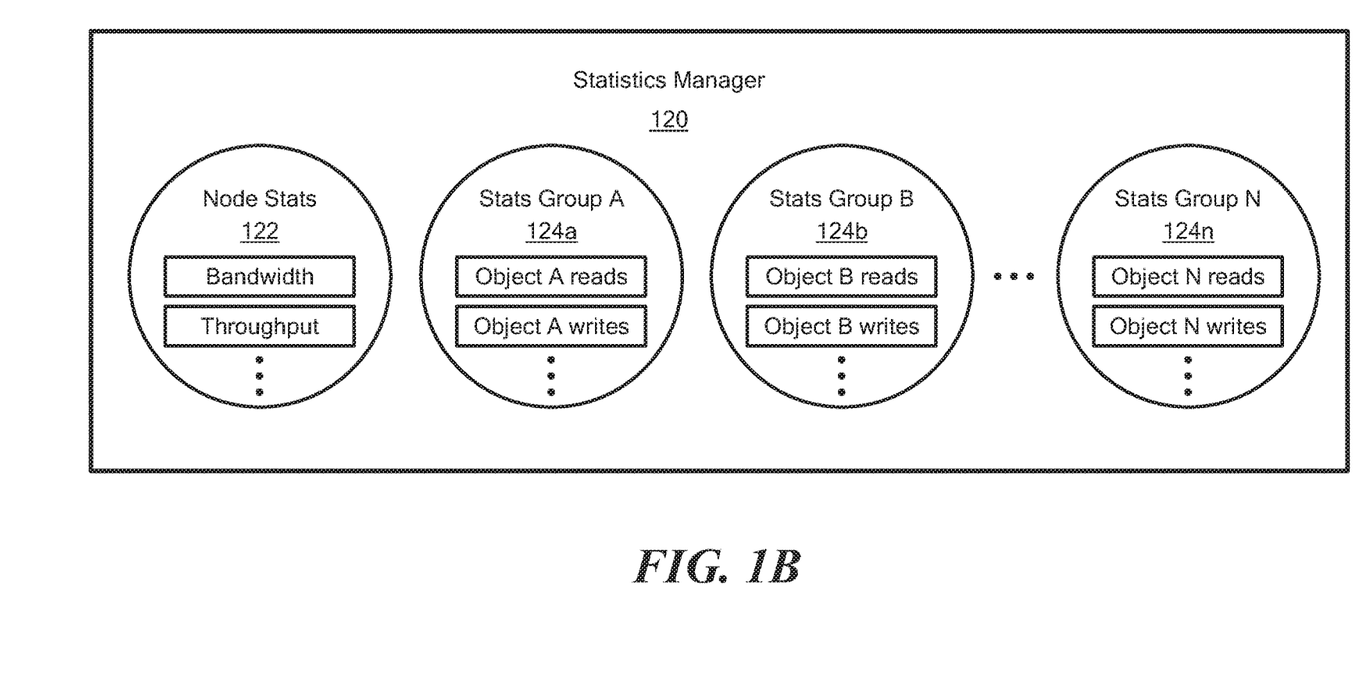
FIG. 1B is a block diagram of an illustrative statistics manager which may form a part of the storage node of FIG. 1A, in accordance with an embodiment of the disclosure.

FIG. 1B shows an example of a statistics manager 120, according to an embodiment of the disclosure. The statistics manager 120—which may be the same as or similar to statistics manager 108*f* of FIG. 1A—includes node statistics 122 and statistics for a plurality of managed objects A, B, . . . , N organized into respective statistics groups 124*a*, 124*b*, . . . , 124*n*. In the simplified example shown, the node stats 122 include bandwidth and throughput for user traffic to and from the node, and the statistics groups 124 include read and write statistics for their respective managed object. The systems and methods sought to be protected herein are not limited to any number or type of statistics.

Over time the amount of data within a statistics group can grow large. Thus, in some embodiments, data associated with its statistics group is not transferred between storage nodes when ownership of a managed object changes.

Figure 2:
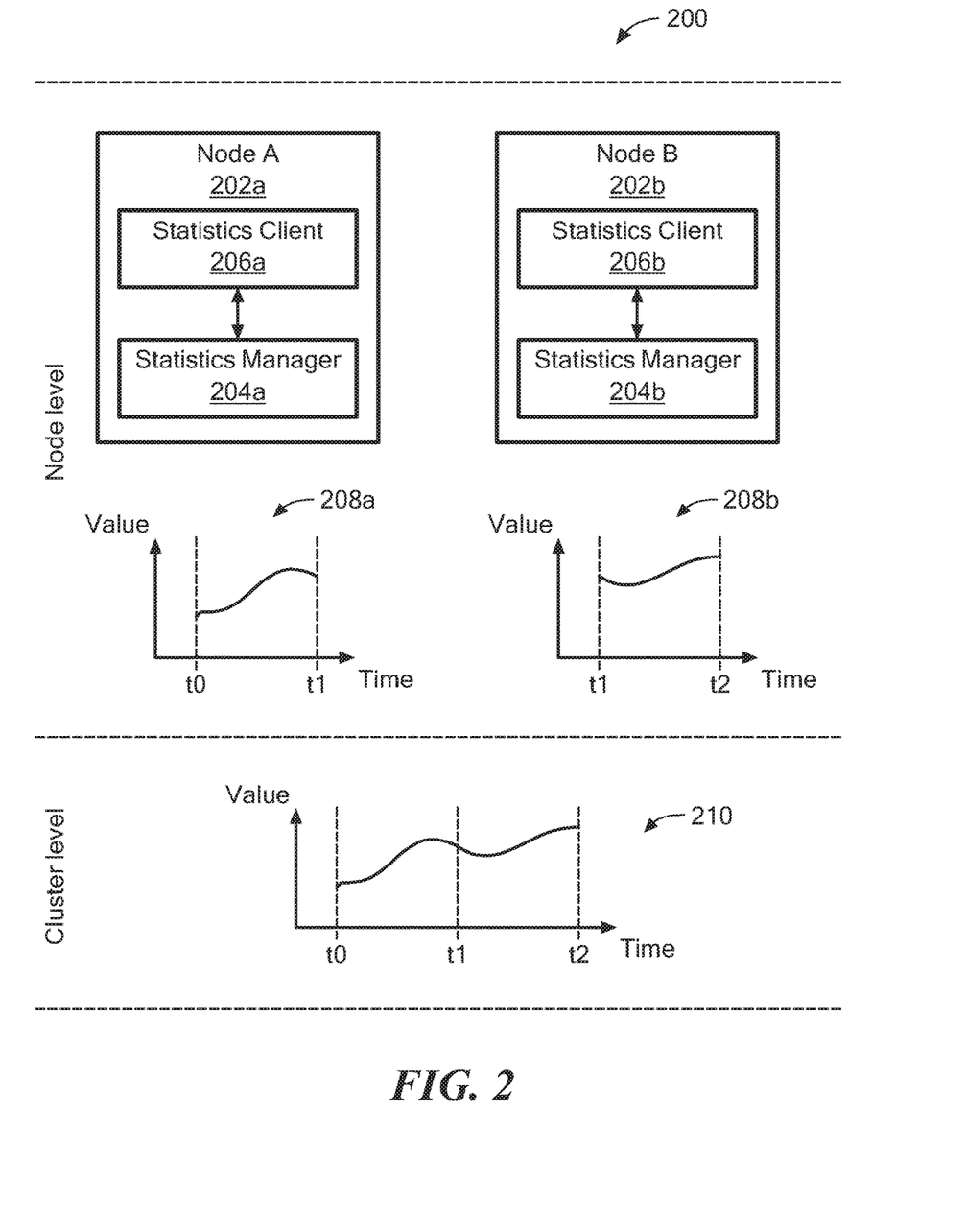
FIG. 2 is a diagram of a distributed storage system and a technique for efficiently managing statistics therein, in accordance with an embodiment of the disclosure.

FIG. 2 illustrates a technique for efficiently managing statistics in a distributed storage system having a flat cluster architecture, according to an embodiment of the disclosure. A cluster 200 includes a plurality of storage nodes 202, with two storage nodes 202*a* and 202*b* shown in this example.

Storage node 202*a*, which may be illustrative of any other node 202, includes a statistics manager 204*a* and one or more statistics clients 206*a*. A statistics client 206*a* may represent any service that utilizes a managed object, such as an of the services 108*a*-108*e* of FIG. 1A. During operation, the statistics client 206*a* may generate updates to statistics values associated with the managed object and send those updated values to the statistics manager 204*a*. Thus, the statistics manager 204*a* can accumulate statistics for various services and managed objects. A statistics client 206*a* may also represent a user or system application that retrieves statistics values from the statistics manager 204. In some embodiments, a statistics manager 204 provides a REST (Representational State Transfer) API via which user and system applications can retrieve statistics.

To avoid transferring statistics between nodes 202 when managed object ownership changes, statistics groups can be treated as virtual. In particular, when a first node 202*a* owns a managed object, the statistics manager 206*a* on that node handles updates to all the statistics associated with the object. When ownership of the managed object changes to a second node 202*b*, statistics accumulated by the first node 202*a* are not transferred to the second node 202 but instead remain on the first node 202*a*. After the ownership change, the second node's storage manager 204*b* handles updates to the managed object's statistics. In some embodiments, before ownership changes to the second node 202*b*, the statistics manager 204*b* on that node may initialize the statistics group associated with the managed object.

In the example of FIG. 1, the first node 202*a* owns a given managed object during time interval [t0, t1] and its statistics manager 204*a* handles statistics value change during that time interval (as shown by graph 208*a*). At time t1, ownership of the object changes to the second node 202*b*, which owns the object until time t2. The statistics manager 204*b* on the second node 202*b* handles the statistics value changes during the time interval [t1, t2] (as shown by graph 208*b*). At the cluster level, when the statistics value is requested (e.g., by a user or system application), the statistics manager 204 may combine the partial data collected on the first and second nodes to generate a single time interval [t0, t2] (graph 210).

The fact that statistics groups are virtual is generally hidden from statistics clients 206. When a statistics value is requested by a client 206, the request is handled at the cluster level. In particular, an arbitrary statistics manager 204 may receive the request and then combine statistics from all other nodes 202 that managed that statistic in the past. In some embodiments, the statistics manager 204 blindly queries all nodes 202 for past data; only the nodes that have data return it.

The statistics manager 204 may use various techniques to combine statistics values collected across multiple nodes 202. Moreover, the technique used may depend on the type of statistic requested. For example, if a time series is requested, the respective interval data may be joined as illustrated by graphs 208*a*, 208*b*, and 210 in FIG. 2. If a sum is requested, the sum of values from all nodes 202 (i.e., a sum of sums) may be calculated. If an average is requested, each node may report a local average value and a number of sample points, which can be used to compute a cluster average. If latest, min, or max is requested, each node can report its local latest/min/max and cluster latest/min/max can be computed therefrom.

It will be appreciated that the above-described techniques allow a distributed storage to scale while allowing for efficient managed object ownership changes. Implementation complexity is hidden from users and other clients by handling statistics reporting at the cluster level in a virtual manner. The disclosed technique provides reliable statistics reporting with relatively low overhead.

Figure 3:
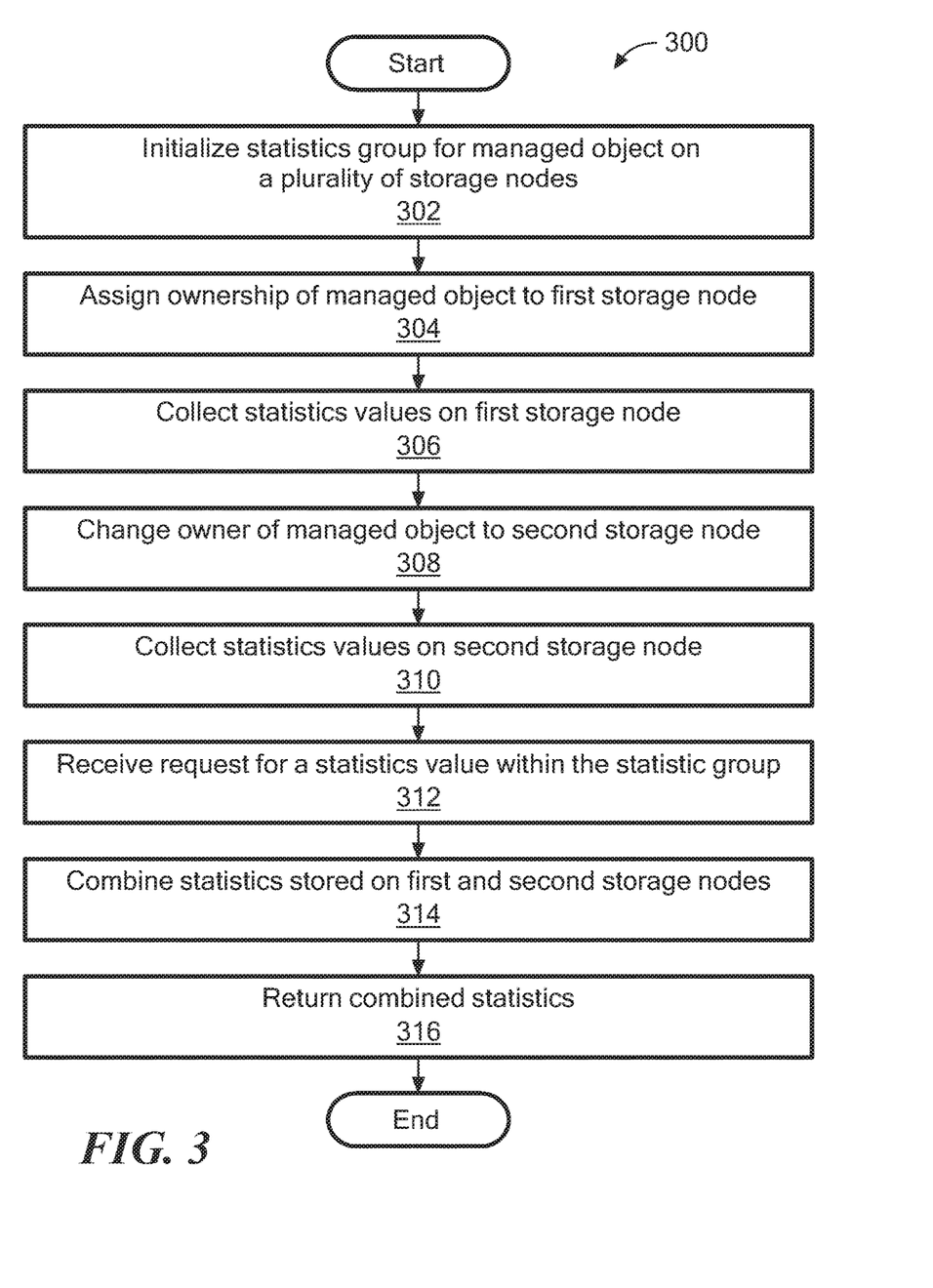
FIG. 3 is a flow diagram showing an illustrative process that may be implemented within a distributed storage system, in accordance with an embodiment of the disclosure.

FIG. 3 is a flow diagram showing illustrative processing that can be implemented within a storage cluster 104 (FIG. 1) and, more particularly, within the statistics management service 108*f* of one or more storage nodes 106' (FIG. 1A). Rectangular elements (typified by element 304), herein denoted "processing blocks," represent computer software instructions or groups of instructions. Diamond shaped elements (typified by element 314), herein denoted "decision blocks," represent computer software instructions, or groups of instructions, which affect the execution of the computer software instructions represented by the processing blocks.

Alternatively, the processing and decision blocks may represent steps performed by functionally equivalent circuits such as a digital signal processor circuit or an application specific integrated circuit (ASIC). The flow diagram does not depict the syntax of any particular programming language. Rather, the flow diagram illustrates the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the concepts, structures, and techniques sought to be protected herein. Thus, unless otherwise stated the blocks described below are unordered meaning that, when possible, the functions represented by the blocks can be performed in any convenient or desirable order.

FIG. 3 shows a process 300 for efficiently managing statistics in a distributed storage system, according to an embodiment of the disclosure. At block 302, a statistics group associated with a managed object may be initialized on a plurality of storage nodes. At block 304, the managed object is assigned to a first storage node, which proceeds to to collect statistics about the managed object (block 306). Subsequently, at block 308, ownership of the managed object changes to a second storage node, which then begins collecting statistics about the managed object (block 310). When a request for statistics is received (block 312), the statistics collected on both the first and second storage nodes may be combined and returned (blocks 314 and 316).

Figure 4:
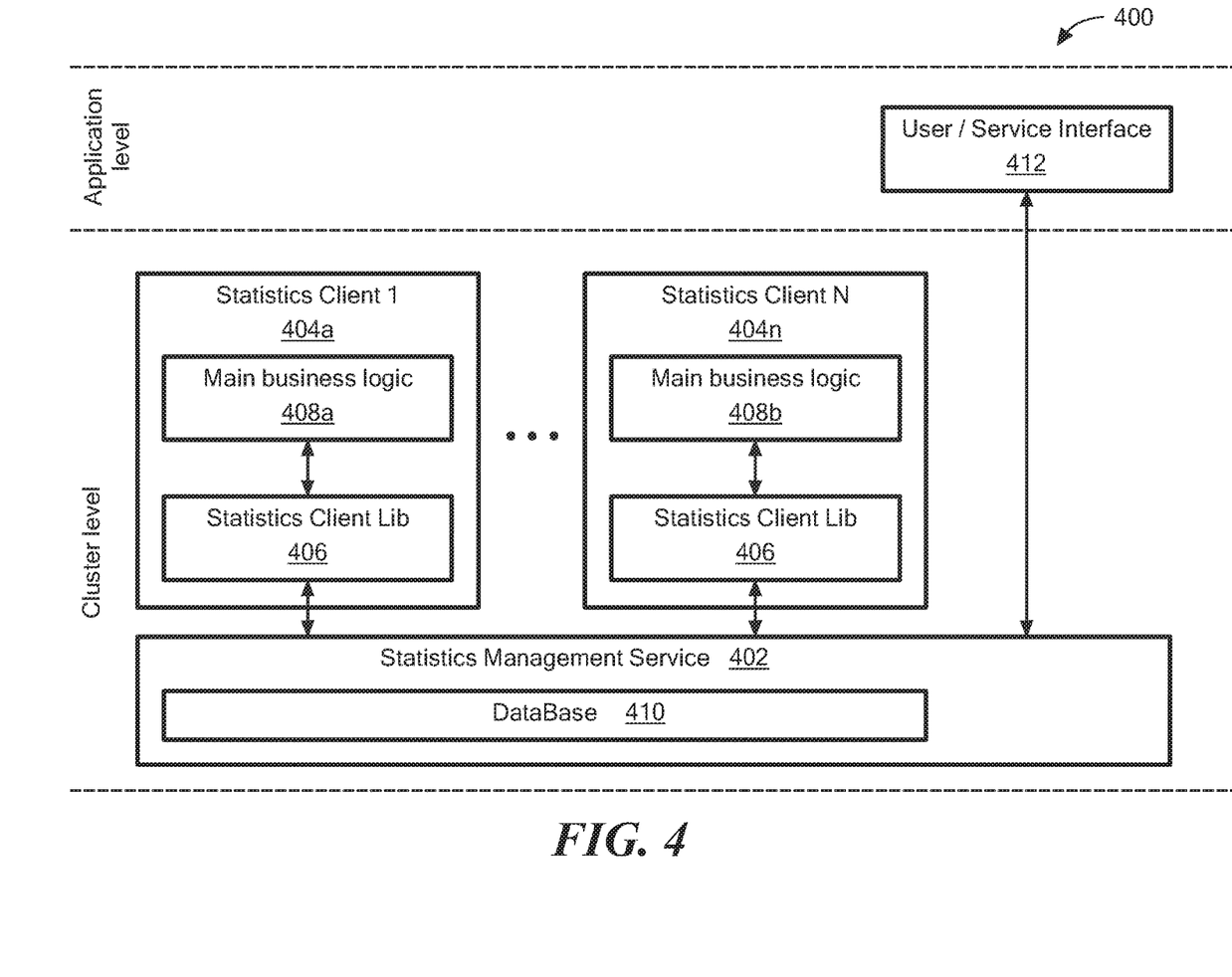
FIG. 4 is a diagram of a distributed storage system using a microservice architecture, in accordance with an embodiment of the disclosure.

Referring to FIG. 4, some distributed storage systems employ a microservice architecture. Microservice architecture is a design pattern whereby complex software systems are composed of relatively small and highly decoupled processes called "microsoervices." By design, a microservice provides limited functionality narrowly focused on a single task. Each microservice may be independently deployable and upgradeable. Microservices may communicate with each other using language-agnostic APIs. Some microservice architectures use inter-process communication mechanisms that are relatively slow, such as REST (Representational State Transfer) APIs or other language-agnostic APIs.

According to some embodiments, one or more of the following design factors may be considered when implementing statistics management within a distributed storage system employing a microservice architecture. First, user and system processes should not directly access storage services that generate statistics. Instead, it is preferable to provide a single point of access for all system statistics. Second, statistics management should be modest in the terms of resource consumption while supporting a large number of frequently updated statistics values.

FIG. 4 shows a distributed storage system employing a microservice architecture, in accordance with an embodiment of the disclosure. A statistics management service (or "statistics manager") 402 may be accessed by a plurality of statistics clients 404a . . . 404n. Each statistics client 404 defines its own set of statistics to be managed by the statistics manager 402. In some embodiments, statistics clients 404 include a statistics client library 406 which may provide a uniform application programming interface (API) between client-specific business logic 408 and the statistics manager 402. All the interactions between a statistics client 404 and the statistics manager 402 may be performed using the statistics client library 406.

In addition to a programmatic API used by the statistics client library, the statistics manager 402 may also provide a REST API that may be accessed by user/system applications 412 to retrieve statistics values. Thus, the statistics manager 402 provides a single access point for all system statistics.

The statistics client library 406 may be configured to maintain local statistics snapshots that are periodically synchronized with statistics manager 402, thus reducing inter-process communication overhead and allowing for high-frequency statistics updates. The statistics client library 406 may also be configured to compute certain statistics functions (e.g., sum of values, most recent value, minimum value, maximum value, etc.) on local data. To reduce the resource consumption associated with sending statistics to the statistics manager 402, the client library 402 may accumulate the difference between the current statistics values and the values previously sent to the statistics manager 402. During a subsequent synchronization, only the difference is sent.

For statistics that are infrequently read, a statistics client 404 may choose to not send unsolicited statistics values to the statistics manager 402. Instead, the client 404 can wait for a user/system application to request that information. Such statistics are referred to as "on-demands statistics." In some embodiments, a user/system application 412 sends a request to the statistics manager 402, which in turn sends an on-demand statistics request to a statistics client 404. An adaptive approach can also be used: when rate of requests for a given on-demand statistic exceeds a predefined threshold, the statistics manager 402 may cache the latest value retrieved from a client 404 use this value to respond to user/system application requests.

In some embodiments, the statistics manager 402 persists statistics in a database 410 to prevent data loss across restarts. The statistics manager 402 may periodically write statistics values (received from the clients 404) to the database 410. On startup, the statistics manager 402 can read the persisted values from the database 410 and the statistics clients 404 can, in turn, request statistics snapshots from the manager 402.

Figure 5:
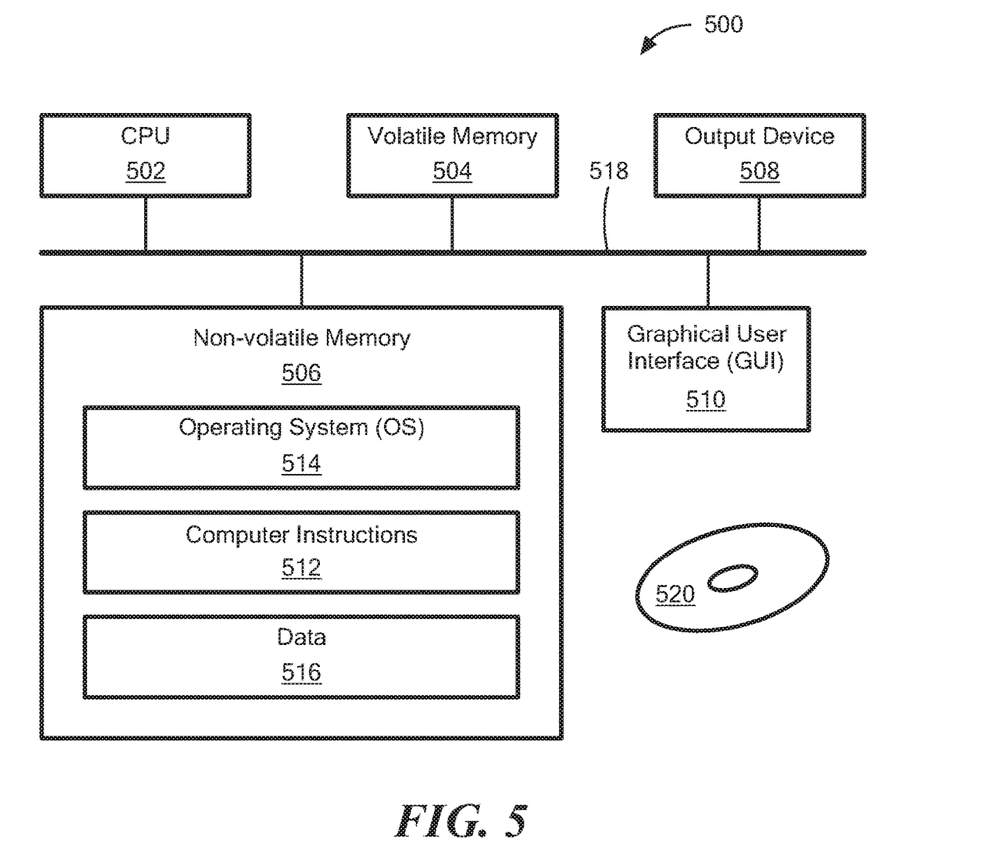
FIG. 5 is a schematic representation of an illustrative computer for use with the systems of FIGS. 1, 1A, 1B, 2, and/or 4, in accordance with an embodiment of the disclosure.

FIG. 5 shows an illustrative computer or other processing device 500 that can perform at least part of the processing described herein, in accordance with an embodiment of the disclosure. The computer 500 includes a processor 502, a volatile memory 504, a non-volatile memory 506 (e.g., hard disk), an output device 508 and a graphical user interface (GUI) 510 (e.g., a mouse, a keyboard, a display, for example), each of which is coupled together by a bus 518. The non-volatile memory 506 stores computer instructions 512, an operating system 514, and data 516. In one example, the computer instructions 512 are executed by the processor 502 out of volatile memory 504. In one embodiment, an article 520 comprises non-transitory computer-readable instructions.

Processing may be implemented in hardware, software, or a combination of the two. In various embodiments, processing is provided by computer programs executing on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that scope of protection sought herein should not be limited to the described embodiments but rather should be limited only by the spirit and scope of the following claims.

What is claimed is:

1. A method for use with a distributed storage system comprising a plurality of storage devices, the method comprising:
   initializing a statistics group on a plurality of storage nodes, the statistics group associated with a managed object;
   assigning ownership of the managed object to a first one of the storage nodes having a data chunk management service and storage devices;
   collecting statistics values for the managed object on the first one of the storage nodes;
   changing ownership of the managed object to a second one of the storage nodes, while continuing to store statistics values collected by the first one of the storage nodes on the first one of the storage nodes after the change of ownership, the second one of the storage nodes having a data chunk management service and storage devices;
   collecting statistics values for the managed object on the second one of the storage nodes;
   receiving, at an arbitrary one of the plurality of storage nodes, a request for a statistics value within the statistics group; and
   responding to the request by: blindly querying, by the arbitrary storage node, each of the other storage nodes in the plurality for statistics values associated with the managed object, receiving, by the arbitrary storage node, the statistics values collected on at least one of the first storage nodes and the second one of the storage nodes, combining, by the arbitrary storage node, the statistics values collected on the first one of the storage nodes and the statistics values collected on the second one of the storage nodes, and returning the combined statistics values; and
   using the combined statistics values to scale out the distributed storage system with cluster-level functions distributed evenly among the plurality of storage nodes.

2. The method of claim 1 wherein the managed object comprises a table configured to store metadata about storage chunks stored within the storage devices.

3. The method of claim 1 wherein combining the statistics values collected on the first one of the storage nodes and the statistics values collected on the second one of the storage nodes comprises computing a statistics function over the statistics values collected on the first one of the storage nodes and the statistics values collected on the second one of the storage nodes.

4. The method of claim 3 wherein computing a statistics function over the statistics values comprises computing a sum of the statistics values, determining a most recent value from the statistics values, determining a maximum value from the statistics values, or determining a minimum value from the statistics values.

5. The method of claim 1 wherein combining the statistics values collected on the first one of the storage nodes and the statistics values collected on the second one of the storage nodes comprises appending time series data collected on the second one of the storage nodes to time series data collected on the first one of the storage nodes.

6. The method of claim 1 wherein the distributed storage system employs a microservice architecture.

7. A distributed storage system, comprising:
   a plurality of storage nodes each having a plurality of storage devices and configured to:
   initialize a statistics group on a plurality of storage nodes, the statistics group associated with a managed object;
   assign ownership of the managed object to a first one of the storage nodes having a data chunk management service and storage devices;
   collect statistics values for the managed object on the first one of the storage nodes;
   change ownership of the managed object to a second one of the storage nodes, while continuing to store statistics values collected by the first one of the storage nodes on the first one of the storage nodes after the change of ownership, the second one of the storage nodes having a data chunk management service and storage devices;
   collect statistics values for the managed object on the second one of the storage nodes;
   receive, at an arbitrary one of the plurality of storage nodes, a request for a statistics value within the statistics group;
   respond to the request by: blindly querying, by a statistics manager included in the arbitrary storage node, a statistics client included in each of the other storage nodes in the plurality for statistics values associated with the managed object, receiving, by the arbitrary storage node, the statistics values collected on at least one of the first storage nodes and the second one of the storage nodes, combining, by the arbitrary storage node, the statistics values collected on the first one of the storage nodes and the statistics values collected on the second one of the storage nodes, and returning the combined statistics values; and
   use the combined statistics values to scale out the distributed storage system with cluster-level functions distributed evenly among the plurality of storage nodes.

8. The distributed storage system of claim 7 wherein the managed object is a table configured to store metadata about storage chunks stored within the storage devices.

9. The distributed storage system of claim 7 wherein ones of the plurality of storage nodes are configured to computing a statistics function over the statistics values collected on the first one of the storage nodes and the statistics values collected on the second one of the storage nodes.

10. The distributed storage system of claim 9 wherein ones of the plurality of storage nodes are configured to compute a sum of the statistics values, to determine a most recent value from the statistics values, to determine a maximum value from the statistics values, or to determine a minimum value from the statistics values.

11. The distributed storage system of claim 7 wherein ones of the plurality of storage nodes are configured to append time series data collected on the second one of the storage nodes to time series data collected on the first one of the storage nodes.

12. The distributed storage system of claim 7 wherein the statistics manager is a microservice.

13. The distributed storage system of claim 7 wherein the statistics manager includes a REST (Representational State Transfer) API configured to process statistics requests from user applications.

14. The distributed storage system of claim 7 wherein the statistics manager includes a database to store statistics received from the plurality of statistics clients.

* * * * *